United States Patent
Rule et al.

(10) Patent No.: US 11,521,213 B2
(45) Date of Patent: Dec. 6, 2022

(54) CONTINUOUS AUTHENTICATION FOR DIGITAL SERVICES BASED ON CONTACTLESS CARD POSITIONING

(71) Applicant: Capital One Services, LLC, McLean, VA (US)

(72) Inventors: Jeffrey Rule, Chevy Chase, MD (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/516,243

(22) Filed: Jul. 18, 2019

(65) Prior Publication Data

US 2021/0019756 A1 Jan. 21, 2021

(51) Int. Cl.
| | |
|---|---|
| *G06Q 20/40* | (2012.01) |
| *G06K 7/08* | (2006.01) |
| *G06Q 20/34* | (2012.01) |
| *H04L 9/40* | (2022.01) |
| *H04L 9/08* | (2006.01) |
| *H04W 12/065* | (2021.01) |
| *G06Q 20/32* | (2012.01) |

(52) U.S. Cl.
CPC ......... *G06Q 20/4018* (2013.01); *G06K 7/082* (2013.01); *G06Q 20/3278* (2013.01); *G06Q 20/352* (2013.01); *H04L 9/0897* (2013.01); *H04L 63/0853* (2013.01); *H04W 12/065* (2021.01)

(58) Field of Classification Search
CPC .......... G06Q 20/4018; G06Q 20/3278; G06Q 20/352; G06K 7/082; H04L 9/0897; H04L 63/0853; H04W 12/065
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Ron White, How Computers Work, 7th edition (Year: 2003).*

(Continued)

*Primary Examiner* — John W Hayes
*Assistant Examiner* — Taylor S Rak
(74) *Attorney, Agent, or Firm* — KDB

(57) ABSTRACT

Various embodiments are generally directed to continuous authentication of a user to a digital service based on activity of a contactless card positioned proximate to a computing device on which the digital service operates. For example, a series of periodic status messages may be provided between a client device and the contactless card to verify whether the contactless card remains active, wherein authorization to access the digital service continues while the contactless card is active, and terminates when the contactless card is inactive.

20 Claims, 8 Drawing Sheets

(56) References Cited

U.S. PATENT DOCUMENTS

| | | |
|---|---|---|
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,813,236 B2 * | 11/2017 | Buer .................. G06F 21/34 |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 * | 6/2005 | Lam .................. G06F 21/123 |
| | | 713/185 |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |

(56) References Cited

U.S. PATENT DOCUMENTS

| | | |
|---|---|---|
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0184355 A1* | 7/2008 | Walrath ............... G06F 21/35 726/9 |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0026277 A1* | 1/2009 | Phillips ............... G06K 19/005 235/495 |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0074232 A1* | 3/2012 | Spodak ............ G06K 19/06206 235/492 |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0189406 A1* | 7/2014 | Hung ................... G06F 1/1698 713/323 |
| 2014/0208112 A1 | 7/2014 | McDonald et al. |
| 2014/0214674 A1 | 7/2014 | Narula |
| 2014/0215218 A1* | 7/2014 | Brands ................ H04L 9/3271 713/172 |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0337957 A1* | 11/2014 | Feekes ............... H04L 63/0853 726/9 |

(56) References Cited

U.S. PATENT DOCUMENTS

| | | |
|---|---|---|
| 2014/0339315 A1 | 11/2014 | Ko |
| 2014/0346860 A1 | 11/2014 | Aubry et al. |
| 2014/0357187 A1* | 12/2014 | Ehrensvard .......... H04B 5/0031 |
| | | 455/41.1 |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0189505 A1* | 7/2015 | Marien ............... H04L 63/0846 |
| | | 380/270 |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087681 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0359850 A1* | 12/2016 | Weiss ............... G06Q 20/40145 |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| EP | 2938112 B1 | 1/2019 |
| GB | 2457221 A | 8/2009 |
| GB | 2516861 A | 2/2015 |
| GB | 2531255 A | 4/2016 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Robert Triggs, What is NFC and how does it work, androidauthority.com (Year: 2019).*

Tom Igoe et al., Beginning NFC, Jan. 2014, O'Reilly Media Inc., First Edition, Ch. 2 & 4 (Year: 2014).*

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

(56) References Cited

OTHER PUBLICATIONS

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-infomnation-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD2_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nI/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application, International Journal of Advanced Computer Science and Applications," 4(8):173-181 (2013).
Author unknown, "EMV Card Personalization Specification", EMVCo., LLC., specification version 1.0, (2003) 81 pages.
Ullmann et al., "On-Card User Authentication for Contactless Smart Cards based on Gesture Recognition", paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).

(56) References Cited

OTHER PUBLICATIONS

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
International Search Report and Written Opinion for International Patent Application No. PCT/US2020/041545 dated Oct. 27, 2020, 12 pages.

* cited by examiner

CONTINUOUS AUTHENTICATION FOR DIGITAL SERVICES BASED ON CONTACTLESS CARD POSITIONING

TECHNICAL FIELD

Embodiments herein generally relate to computing platforms, and more specifically, to providing continuous authentication to a digital service when a contactless card is positioned proximate a computing device.

BACKGROUND

User authentication is typically required when accessing a service, such as a digital wallet, website, network, application, and the like. Commonly deployed authentication methods include password authentication, iris authentication, facial authentication, voice authentication, fingerprint authentication, vein authentication, predetermined gestures, etc.

For security reasons, these authentication methods provide limits on how long an authenticated user may stay logged-in to the service. However, requiring continuous re-authentication by the user to avoid being logged-out of the service can cause undue user attention and effort, which can lead to a decreased user experience.

SUMMARY

Embodiments disclosed herein provide systems, methods, articles of manufacture, and computer-readable media for providing continuous authentication to a digital service based on proximity of a contactless card to a computing device. According to one example, a system may include a processor circuit and a memory storing instructions which when executed by the processor circuit, cause the processor circuit to receive, by an application executing on the processor circuit, a request to access a digital service, receive, by the application, a first authentication based on verification of a first set of encrypted data associated with a user account, request, by the application, a second authentication from a contactless card, and receive, by a card reader of a client device, a second set of encrypted data from a communications interface of the contactless card in response to the contactless card being activated, the second set of encrypted data generated based on a cryptographic algorithm and a diversified key, the diversified key stored in a memory of the contactless card, wherein the contactless card is activated by the client device when the contactless card is positioned proximate the client device, and wherein the second set of encrypted data is associated with the user account. The system further includes instructions, which when executed by the processor circuit, cause the processor circuit to receive, by the application from a server, a second verification of the user account based on the second set of encrypted data, authorize, by the application, access to the digital service in response to the first and second verification of the user account, and continuously provide, by the application, a series of periodic status messages between the client device and the contactless card to verify whether the contactless card remains active, wherein authorization to access the digital service continues while the contactless card is active, and wherein authorization to access the digital service terminates when the contactless card is inactive.

According to another example, a method may include receiving, by an application executing on the processor circuit, a request to access a digital service, receiving, by the application, a first authentication based on verification of a first set of encrypted data associated with a user account, and requesting, by the application, a second authentication from a contactless card. The method may further include receiving, by a card reader of a client device, a second set of encrypted data from a communications interface of the contactless card in response to the contactless card being activated, the second set of encrypted data generated based on a cryptographic algorithm and a diversified key, the diversified key stored in a memory of the contactless card, wherein the contactless card is activated by the client device when the contactless card is positioned proximate the client device, and wherein the second set of encrypted data is associated with the user account. The method may further include receiving, by the application from a server, a second verification of the user account based on the second set of encrypted data, authorizing, by the application, access to the digital service in response to the first and second verification of the user account, and continuously providing, by the application, a series of periodic status messages between the client device and the contactless card to verify whether the contactless card remains active, wherein authorization to access the digital service continues while the contactless card is active, and wherein authorization to access the digital service terminates when the contactless card is inactive.

According to another example, a non-transitory computer-readable storage medium having computer-readable program code embodied therewith, the computer-readable program code executable by a processor circuit, may cause the processor circuit to receive, by an application executing on the processor circuit, a request to access a digital service receive, by the application, a first authentication based on verification of a first set of encrypted data associated with a user account, and request, by the application, a second authentication from a contactless card. The computer-readable program code executable by the processor circuit may further cause the processor circuit to receive, by a card reader of a client device, a second set of encrypted data from a communications interface of the contactless card in response to the contactless card being activated, the second set of encrypted data generated based on a cryptographic algorithm and a diversified key, the diversified key stored in a memory of the contactless card, wherein the contactless card is activated by the client device when the contactless card is positioned proximate the client device, and wherein the second set of encrypted data is associated with the user account. The computer-readable program code executable by the processor circuit may further cause the processor circuit to receive, by the application from a server, a second verification of the user account based on the second set of encrypted data, authorize, by the application, access to the digital service in response to the first and second verification of the user account, and continuously provide, by the application, a series of periodic status messages between the client device and the contactless card to verify whether the contactless card remains active, wherein authorization to access the digital service continues while the contactless card is active, and wherein authorization to access the digital service terminates when the contactless card is inactive.

Figure 1:
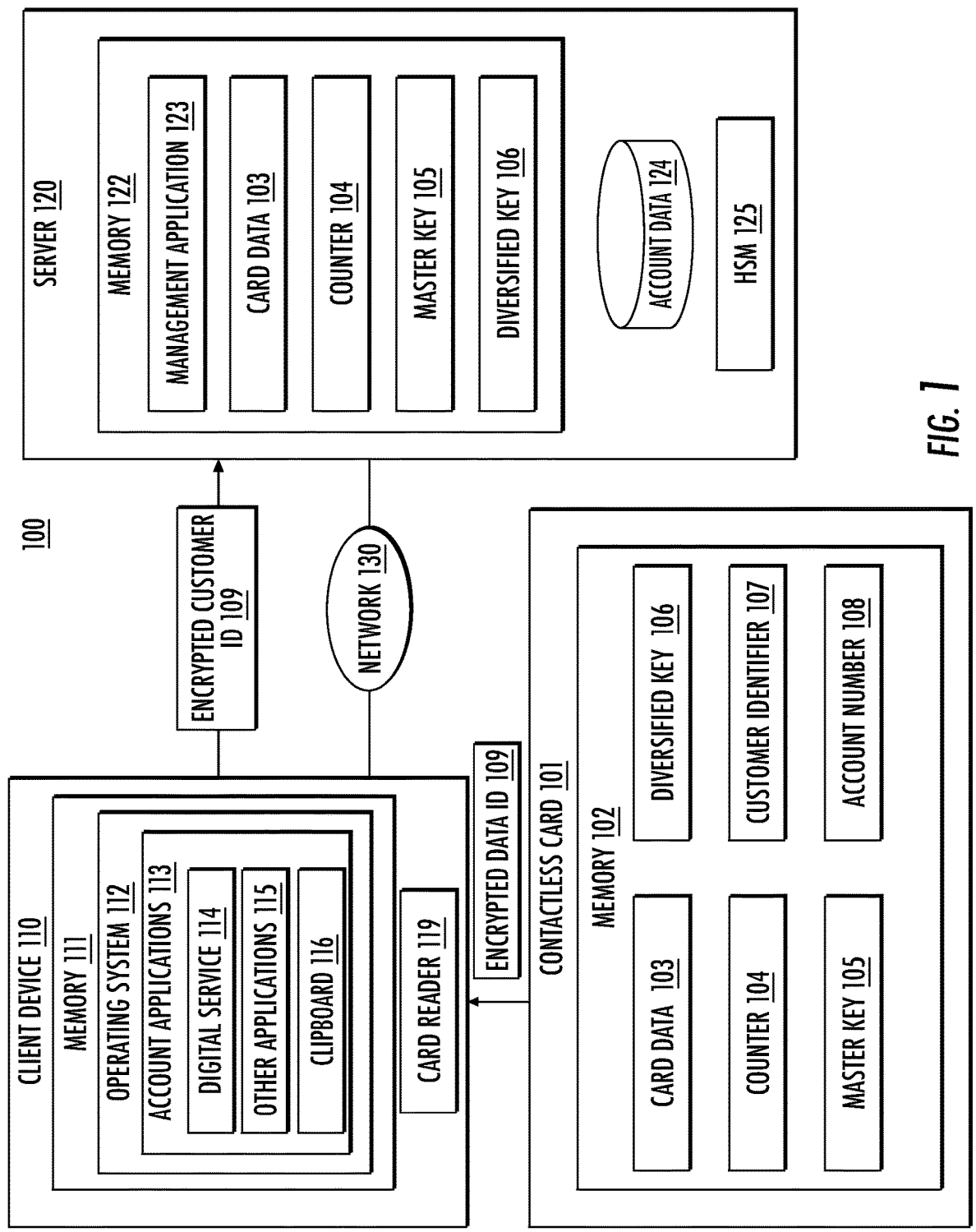
FIG. 1 illustrates an embodiment of a system for providing continuous authentication to a digital service.

The drawings are not necessarily to scale. The drawings are merely representations, not intended to portray specific parameters of the disclosure. The drawings are intended to depict example embodiments of the disclosure, and therefore are not be considered as limiting in scope. Certain elements in some of the FIG.s may be omitted, or illustrated not-to-scale, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments disclosed herein provide continuous authentication of a contactless card based on proximity to a client device, such as a mobile device or personal computer. In some embodiments, continuous activation may allow the contactless card to provide authentication with a digital service so long as the contactless card is positioned proximate a card reader of the client device. For example, a series of periodic "heartbeat" or status messages may be provided between the client device and the contactless card to verify whether the contactless card remains active, wherein authorization to access the digital service continues while the contactless card is active, and terminates when the contactless card is inactive.

In some embodiments, a device or covering over the client device may be employed to receive and position the contactless card relative to the client device. In particular, the covering may include a slot or receptacle positioned proximate the card reader of the mobile device. While the contactless card is retained within the covering, the contactless card may be continuously activated by an electromagnetic field of the client device. This continuous activation in turn may allow the contactless card to provide authentication with the digital service so long as the contactless card remains within the covering. Removal of the contactless card from the covering may result in loss of the electromagnetic field, thus terminating the authentication with the digital service.

Advantageously, providing continuous authentication using "heartbeat" or status messaging improves ease of interaction with digital services by users. For example, users can be authenticated once, and stay logged-in to the digital service based on the authentication so long as the contactless card remains active. By reducing the number of times the user must enter authentication information, security of the card data may be enhanced.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more contactless cards 101, one or more client devices 110, and one or more servers 120. The contactless cards 101 are representative of any type of identification and/or payment card, such as a credit card, debit card, ATM card, gift card, and the like. The contactless card 101 may include one or more chips (not depicted), such as a radio frequency identification (RFID) chip, configured to communicate with the client device 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The client device 110 is representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 102 of the contactless card may include card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may comprise an account number, an expiration date, a billing address, and a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. As described in greater detail herein, the contactless card 101 may provide the card data 103 and/or a record from the account numbers 108 to an account application 113 to provide authentication/access to a digital service 114.

As shown, a memory 111 of the client device 110 includes an instance of an operating system (OS) 112. Example operating systems 112 include the Android® OS, iOS®, Linux®, and Windows® operating systems. As shown, the OS 112 may include the account application 113, the digital service 114, one or more other applications 115, and a clipboard 116. In embodiments wherein the digital service is a banking application or website, the account application 113 may allow users to perform various account-related operations, such as viewing account balances, purchasing items, and processing payments. Initially, a user must authenticate using authentication credentials to access the account application 113. For example, the authentication credentials may include a username and password, biometric credentials, and the like. As will be described in greater detail below, to access the account application 113 and/or the digital service 114, the user must also satisfy a secondary authentication based on data exchanged between the client device 110 and the contactless card 101.

The digital service 114 may include one or more services including, but not limited to, a client device application (e.g., banking, social media, music streaming, gaming, etc.), a website, a messaging service (e.g., e-mail, text, etc.), and many others. Embodiments herein are not limited in this context. In some embodiments, the digital service 114 is associated with the account application 113. For example, the digital service 114 may be installed on the client device 110, operable with the account application 113.

As shown, the server 120 includes a data store of account data 124 and a memory 122. The account data 124 may include account-related data for one or more users and/or accounts. The account data 124 may include at least a master key 105, counter 104, a customer ID 107, an associated contactless card 101, account holder name, account billing address, one or more shipping addresses, one or more card numbers, and biographical information for each account. The memory 122 may include a management application 123 and instances of the card data 103, the counter 104, master key 105, and diversified key 106 for one or more accounts from the account data 124.

The system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key 105 may be kept secret from all parties other than the contactless card 101 and server 120, thereby enhancing security of the system 100.

The master key 105 may be used in conjunction with the counter 104 to enhance security using key diversification. The counter 104 comprises values that are synchronized between the contactless card 101 and server 120. The counter 104 value may comprise a number that changes each time data is exchanged between the contactless card 101 and the server 120 (and/or the contactless card 101 and the client device 110). To enable NFC data transfer between the contactless card 101 and the client device 110, the account application 113 may communicate with the contactless card 101 when the contactless card 101 is sufficiently close to a card reader 118 of the client device 110. Card reader 118 may be configured to read from and/or communicate with contactless card 101 (e.g., via NFC, Bluetooth, RFID, etc.). Therefore, example card readers 118 may include NFC communication modules, Bluetooth communication modules, and/or RFID communication modules.

For example, a user may bring the contactless card 101 to the client device 110, thereby bringing the contactless card 101 sufficiently close to the card reader 118 of the client device 110 to enable NFC data transfer between the contactless card 101 and the card reader 118 of the client device 110. In some embodiments, the client device 110 may trigger the card reader 118 via an application programming interface (API) call. In addition and/or alternatively, the client device 110 may trigger the card reader 118 based on periodically polling the card reader 118. More generally, the client device 110 may trigger the card reader 118 to engage in communications using any feasible method. In some embodiments, the contactless card 101 may be powered/activated in response to a magnetic field of the client device 110.

After communication has been established between client device 110 and contactless card 101, the contactless card 101 may generate a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter 104 value maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the client device 110, which may then forward the MAC cryptogram to the server 120 for verification as explained below. However, in some embodiments, the client device 110 may verify the MAC cryptogram. Embodiments herein are not limited in this context.

More generally, when preparing to send data (e.g., to the server 120 and/or the client device 110), the contactless card 101 may increment the counter 104 value. The contactless card 101 may then provide the master key 105 and counter 104 value as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data (e.g., the encrypted customer ID 109) to the account application 113 of the client device 110 (e.g., via an NFC connection, Bluetooth connection, etc.). The account application 113 of the client device 110 may then transmit the encrypted data to the server 120 via the network 130. In at least one embodiment, the contactless card 101 transmits the counter 104 value with the encrypted data. In such embodiments, the contactless card 101 may transmit an encrypted counter 104 value, or an unencrypted counter 104 value.

Upon receiving the encrypted customer ID 109, the management application 123 of the server 120 may perform the same symmetric encryption using the counter 104 value as input to the encryption, and the master key 105 as the key for the encryption. As stated, the counter 104 value may be specified in the data received from the client device 110, or a counter 104 value maintained by the server 120 to implement key diversification for the contactless card 101. The output of the encryption may be the same diversified key value 106 that was created by the contactless card 101. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the client device 110, e.g., by comparing the decrypted customer ID 107 to a customer ID in the account data 124 for the account.

Although the counter 104 is used as an example, other data may be used to secure communications between the contactless card 101, the client device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In some examples, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, the key diversification technique may be used to perform secure operations using the contactless card 101. For example, once the management application 123 verifies the encrypted customer ID 109 using key diversification, the management application 123 may transmit an account number, expiration date, and/or CVV associated with the account to the account application 113 of the client device 110. The management application 123 may further include other information (e.g., first name, last name, shipping address, billing address, other account information, etc.). The account number may be a PAN, a virtual account number, and/or a token generated based on the PAN. The account application 113 may decrypt the received data (if encrypted) and provide the account number, expiration date, billing address, and/or CVV to an API of the digital service 114.

In another embodiment, the card data 103 is read directly from the contactless card 101, which may be useful if the client device 110 does not have a connection to the server 120. For example, the account application 113 and/or the digital service 114 may output an indication to bring the contactless card 101 proximate to the client device 110. In one embodiment, once the contactless card 101 is brought near the client device 110, the contactless card 101 transmits the card data 103 to the client device 110. In another embodiment, once the contactless card 101 is brought near the client device 110, the account application 113 may instruct the contactless card 101 to transmit the card data 103 to the client device 110. In one example, the contactless card 101 transmits the card data 103 (including one or more of the account number, expiration date, CVV value, and the account holder's name) to the client device 110 in an NDEF file (e.g. via NFC, Bluetooth, and/or RFID). In another example, the contactless card 101 transmits the card data 103 using the EMV protocol. In examples where the EMV protocol is used, the card data 103 transmitted using the EMV protocol includes the account number, expiration date, and the account holder's name. The contactless card 101 may then transmit the card data 103 to the account application 113 using the EMV protocol. In examples where the EMV protocol is used, the account application 113 may receive the CVV value from the contactless card 101 (e.g., via the NFC read to receive the CVV in an NDEF file) and/or from the management application 123 of the server 120. However, in some embodiments, the EMV protocol may be used to transmit the CVV value directly from the contactless card 101. The account application 113 may then provide the card data 103 (e.g., the account number, expiration date, and/or CVV) to the API of the digital service 114.

Regardless of the technique used to provide card data 103 and/or the account number 108 to the digital service 114, the account application 113 and/or the OS 112 may manage the data provided to the digital service 114. For example, the card data 103 and/or the account number 108 may be maintained at the digital service 114 so long as the contactless card 101 is active, e.g., when positioned adjacent the client device 110. Access/authentication to the digital service 114 is therefore maintained. As another example, the card data 103 and/or the account number 108 may be maintained at the digital service 114 after the card data 103 and/or the account number 108 has been used to make a purchase.

Furthermore, the account application 113 and/or the digital service 114 may copy an account number to the clipboard 116 of the OS. The clipboard 116 stores data that can be copied and/or pasted within the OS 112. For example, the clipboard 116 may store data locally for pasting into fields of the client device 110, and a user may input/paste the data stored in the clipboard 116 using a command and/or gesture available within the OS 112. For example, copying the account number to the clipboard 116 allows the user to paste the account number to the corresponding form field using a command and/or gesture available within the OS 112. Further still, the digital service 114 may output a notification which specifies the expiration date and the CVV while the account number is copied to the clipboard 116. Doing so allows the user to manually enter the expiration date and CVV to the corresponding form fields while the notification remains in view. In some embodiments, the account application 113 and/or the digital service 114 may also copy the expiration date, billing address, and/or the CVV to the clipboard 116, allowing the expiration date, billing address, and/or the CVV to be pasted to the corresponding form fields.

Figure 2:
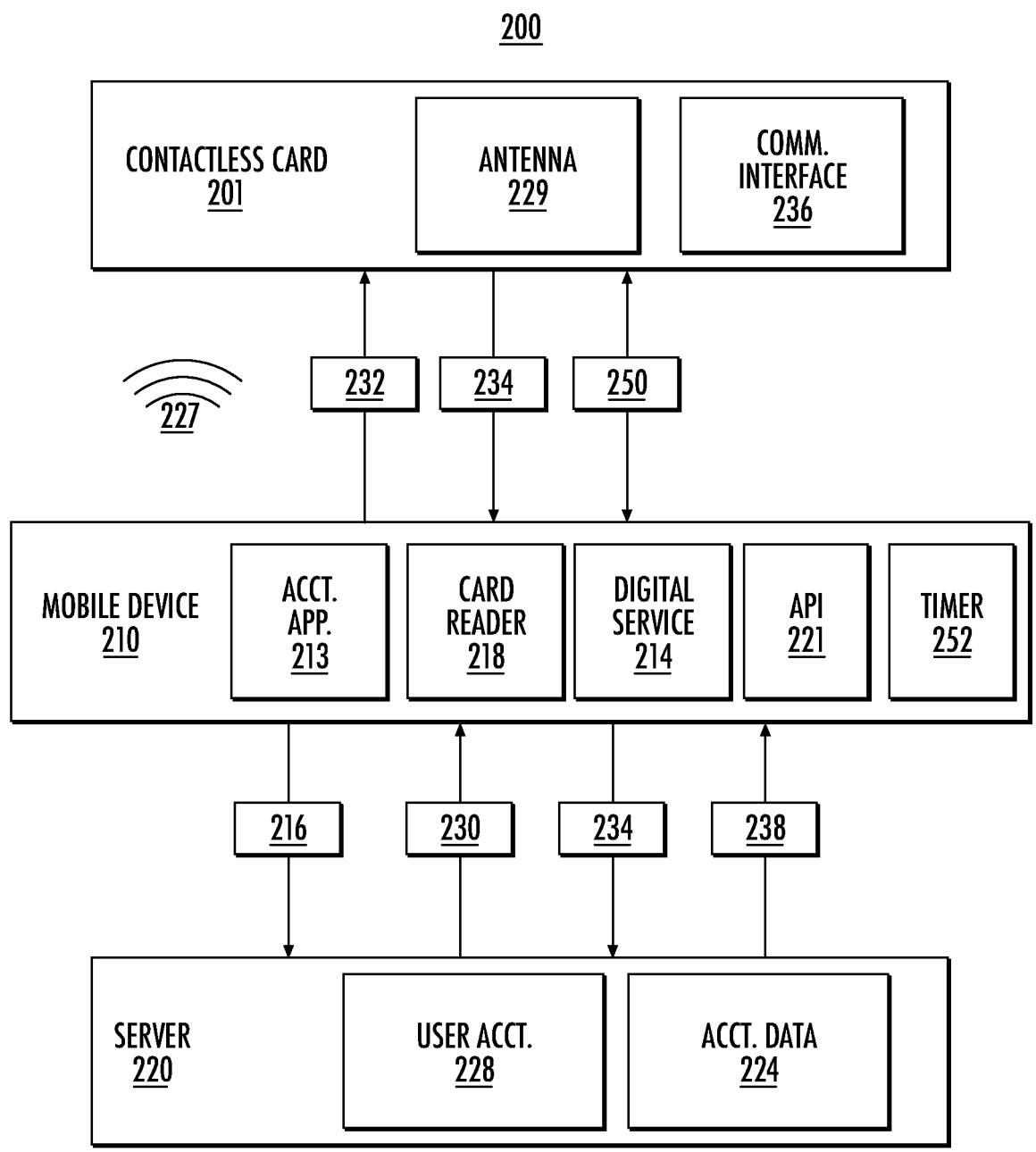
FIGS. 2-3 illustrate embodiments for providing continuous authentication to the digital service based on proximity of a contactless card to a computing device.

FIG. 2 is a schematic 200 depicting an example embodiment for providing continuous authentication to the digital service 214 based on proximity of the contactless card 201 to a client device, such as a mobile device 210. Although non-limiting, the mobile device 210 may be a smart phone or tablet computer. In other embodiments, the client device may be a laptop, desktop computer, or transaction kiosk. For example, the client device may be laptop computer with an internal or external reader for communicating with the contactless card 201. Embodiments herein are not limited in this context.

In this non-limiting example, the digital service 214 may be a banking application stored within memory of the mobile device 210. The user may bring the contactless card 201 in close physical proximity to the mobile device 210. One or more chips and/or chip modules (not depicted) of the contactless card 201 may then be activated with power obtained from an electromagnetic field 227 of the mobile device 210. More specifically, the contactless card 201 may be operable to receive the electromagnetic field 227 and convert it to a suitable electrical voltage to power the other circuit components of the contactless card 201. For example, the electromagnetic field 227 may be converted to power a RFID chip, which is configured to communicate with the mobile device 210 via, e.g., NFC, the EMV standard, or other short-range protocols in wireless communication.

When the user initially attempts to log in to his/her account, log-in credentials received by an API 221 of the digital service 214 are delivered to a server 220 as a first set of encrypted data 216. The first set of encrypted data 216 may be associated with a user account 228, which in turn is associated with a data store of account data 224.

The server 220 may then compare, for example by the management application 123 (FIG. 1), the first set of encrypted data 216 to a customer identifier in the account data 224 for the user account 228, validating or invalidating the data accordingly. In the event of a positive match, a first authentication/verification 230 is then provided to the mobile device 210.

The digital service 214 may then request a second authentication 232 from the contactless card 201. In some embodiments, the contactless card 201 may have been previously activated based on the electromagnetic field 227 received from the client device 201. In other embodiments, the contactless card 201 may be inactive, in which case the contactless card 201 needs to be activated to complete the request for the second authentication 232. For example, the user may not have previously placed the contactless card 201 proximate the mobile device 210, or the position of the contactless card 201 relative to a card reader 218 of the mobile 210 results in an inadequate communication signal strength emanating from the contactless card 201. In either case, the mobile device 210 may display a prompt to the user via a graphical user interface (GUI). For example, a notification may instruct the user to place the contactless card 201 in physical contact with a back surface of the mobile device 210. In other embodiments, the notification may provide feedback regarding the strength of the electromagnetic field 227 and/or a signal strength of the contactless card 201.

Once the contactless card 201 is active, the card reader 218 of the mobile device 201 may receive a second set of encrypted data 234 from a communications interface 236 of the contactless card 201. In some embodiments, the second set of encrypted data 234 may be generated based on a cryptographic algorithm and a diversified key stored in memory of the contactless card 201. The second set of encrypted data 234 is associated with the user account 228.

The server 220 may then receive the second set of encrypted data 234 from the mobile device 210, comparing it to the customer identifier in the account data 224 for the user account 228, and validating or invalidating the data accordingly. In the event of a positive match, a second authentication/verification 238 is then provided to the mobile device 210. Access to the digital service 214 may then be provided, e.g., by an account application 213 in response to the first verification 230 and the second verification 238 of the user account 228.

Once the user has successfully logged in to the digital service 214, authorization to access the digital service 214 continues while the contactless card 201 is active. To accomplish this, the account application 213 may cause a series of periodic heartbeat or status messages 250 to be provided between the mobile device 210 and the contactless card 201 to verify whether the contactless card 201 is still active. In some embodiments, the status messages 250 may be a series of requests or "pings" to the contactless card 201, which result in a communication response via an antenna 229 of the contactless card 201. For example, the status messages 250 may trigger the card reader 218 of the contactless card 201 via an application programming interface (API) call. However, the status messages 250 may trigger the card reader to engage in communications using any feasible method. In the event the contactless card 201 is determined to be inactive, e.g., in the case no communication response is received by the contactless card 201, authorization to access the digital service 214 may be terminated.

Although non-limiting, the status messages 250 can be sent unencrypted or encrypted, signed, or otherwise secured. In some embodiments, the status messages 250 may include one or more verification messages, which include, for example, reporting on the active/inactive status of the contactless card 201. Furthermore, the status messages 250 may be related to the first verification 230 and/or the second verification 238.

In some embodiments, the status messages 250 can include sending any kind of command or query, transmitted securely or transmitted in the open, receiving a response from the contactless card 201, and then evaluating the response to determine if the response is within a range of parameters expected. In yet other embodiments, the mobile device 210 may include a timer 252 set to periodically transmit the status messages 250. Access to the digital service 214 may continue until the account application 213 determines the signal strength of the contactless card 201 is below a predetermined threshold value, which may occur, for example, if the contactless card 201 is moved away from the mobile device 210 or the mobile device 210 enters a sleep mode. In some embodiments, the account application 213 may prevent the mobile device 210 from entering the sleep mode when the contactless card 201 is active.

Figure 3:
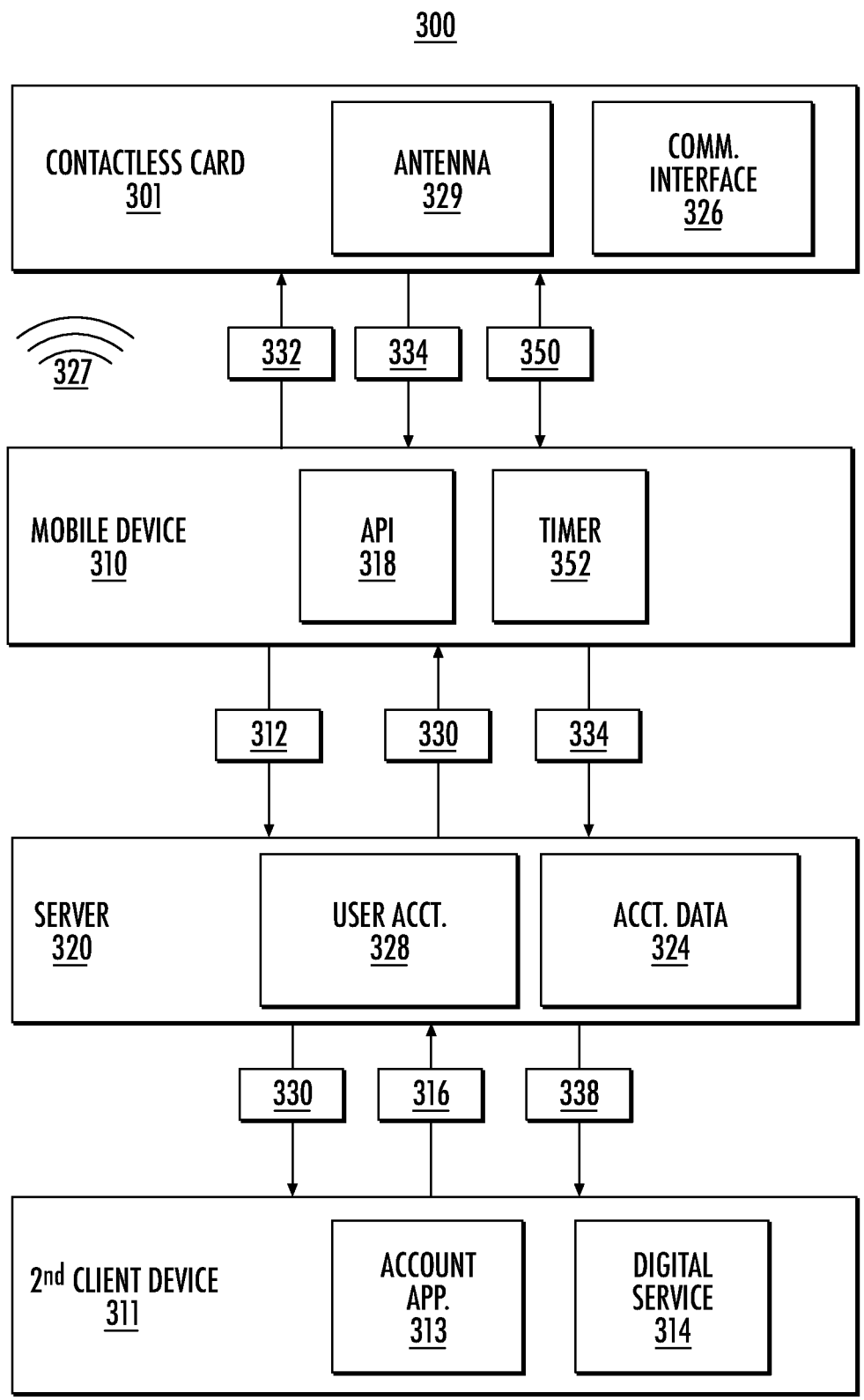

FIG. 3 is a schematic 300 depicting an example embodiment for providing continuous authentication to a digital service 314 based on proximity of a contactless card 301 to a mobile device 310. The schematic 300 may be similar to the schematic 200 described above. As such, only certain aspects of the schematic 300 will hereinafter be described for the sake of brevity.

As shown, the schematic 300 may include a second client device 311, such as a personal computer. In this non-limiting example, the digital service 314 may be a banking website operating/displayed on the second client device 311. An account application 313 may be located on the second client device 311. In other embodiments, the account application 313 may be part of the mobile device 310. In yet other embodiments, the account application 313 may be split between the mobile device 310 and the second client device 311.

When the user initially attempts to log in to his/her account, log-in credentials received by the digital service 314 are delivered to a server 320 as a first set of encrypted data 316, which may be associated with a user account 328 of the user. The server 320 may then compare, for example by a management application, the first set of encrypted data 316 to a customer identifier in an account data 324 for the user account 328, validating or invalidating the data accordingly. In the event of a positive match, a first authentication/verification 330 is then provided from the server 320 to the second client device 311.

The digital service 314 may then request the second authentication 332 from the contactless card 301. In some embodiments, the second authentication 332 request may be delivered directly to the mobile device 310, or may be sent to the server 320 for subsequent delivery to the mobile device 310. The contactless card 301 may have been previously activated based on a magnetic field 327 received from the client device 301. In other embodiments, the contactless card 301 may be inactive, in which case the contactless card 301 needs to be activated to complete the request for the second authentication 332.

Once the contactless card 301 is active, the card reader 318 of the mobile device 301 may receive a second set of encrypted data 334 from the communications interface 336 of the contactless card 301. In some embodiments, the second set of encrypted data 334 may be generated based on a cryptographic algorithm and a diversified key stored in memory of the contactless card 301. The second set of encrypted data 334 is associated with the user account 328.

The server 320 may then receive the second set of encrypted data 334 from the mobile device 310, comparing it to the customer identifier in the account data 324 for the user account 328, and validating or invalidating the data accordingly. In the event of a positive match, the second authentication/verification 338 is then provided to the second client device 311. Access to the digital service 314 may then be provided, e.g., by the account application 313 in response to the first verification 330 and the second verification 338 of the user account 328.

Once the user has successfully logged in to the digital service 314, authorization to access the digital service 314 may continue while the contactless card 301 is active. To accomplish this, the account application 313 may cause a series of periodic heartbeat or status messages 350 to be provided between the mobile device 310 and the contactless card 301 to verify whether the contactless card 301 is still active. In some embodiments, the status messages 350, or an output of the status messages (e.g., contactless card active/inactive), may be delivered to the server 320 and then to the second client device 311. In some embodiments, the status messages 350 may be communicated directly to the second client device 311. In the event the contactless card 301 is determined to be inactive, authorization to access the digital service 314 may be terminated.

Figure 4A:
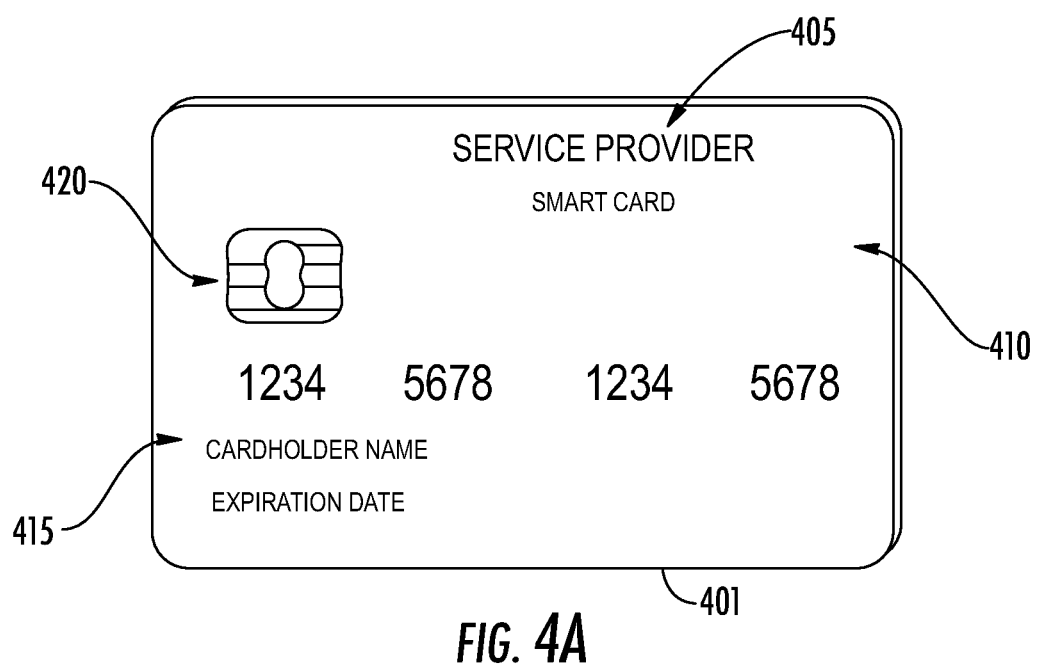
FIGS. 4A-4B illustrate embodiments of a contactless card.

FIG. 4A illustrates an exemplary contactless card 401, which may be a payment card, such as a credit card, debit card, and/or a gift card. As shown, the contactless card 401 may be issued by a service provider 405 displayed on the front or back of the card 401. In some examples, the contactless card 401 is not related to a payment card, and may comprise, without limitation, an identification card. In some examples, the payment card may comprise a dual interface contactless payment card. The contactless card 401 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 401 may have physical characteristics compliant with the ID-1 format of the ISO/IEC 7810 standard, and the contactless card may otherwise be compliant with the ISO/IEC 14443 standard. However, it is understood that the contactless card 401 according to the present disclosure may have different characteristics, and the present disclosure does not require a contactless card to be implemented in a payment card.

The contactless card 401 may also include identification information 415 displayed on the front and/or back of the card, and a contact pad 420. The contact pad 420 may be configured to establish contact with another communication device, such as the client device(s) 110 (FIG. 1), a user device, smart phone, laptop, desktop, or tablet computer. The contactless card 401 may also include processing circuitry, antenna and other components not shown in FIG. 4A. These components may be located behind the contact pad 420 or elsewhere on the substrate 410. The contactless card 401 may also include a magnetic strip or tape, which may be located on the back of the card (not shown in FIG. 4A).

Figure 4B:
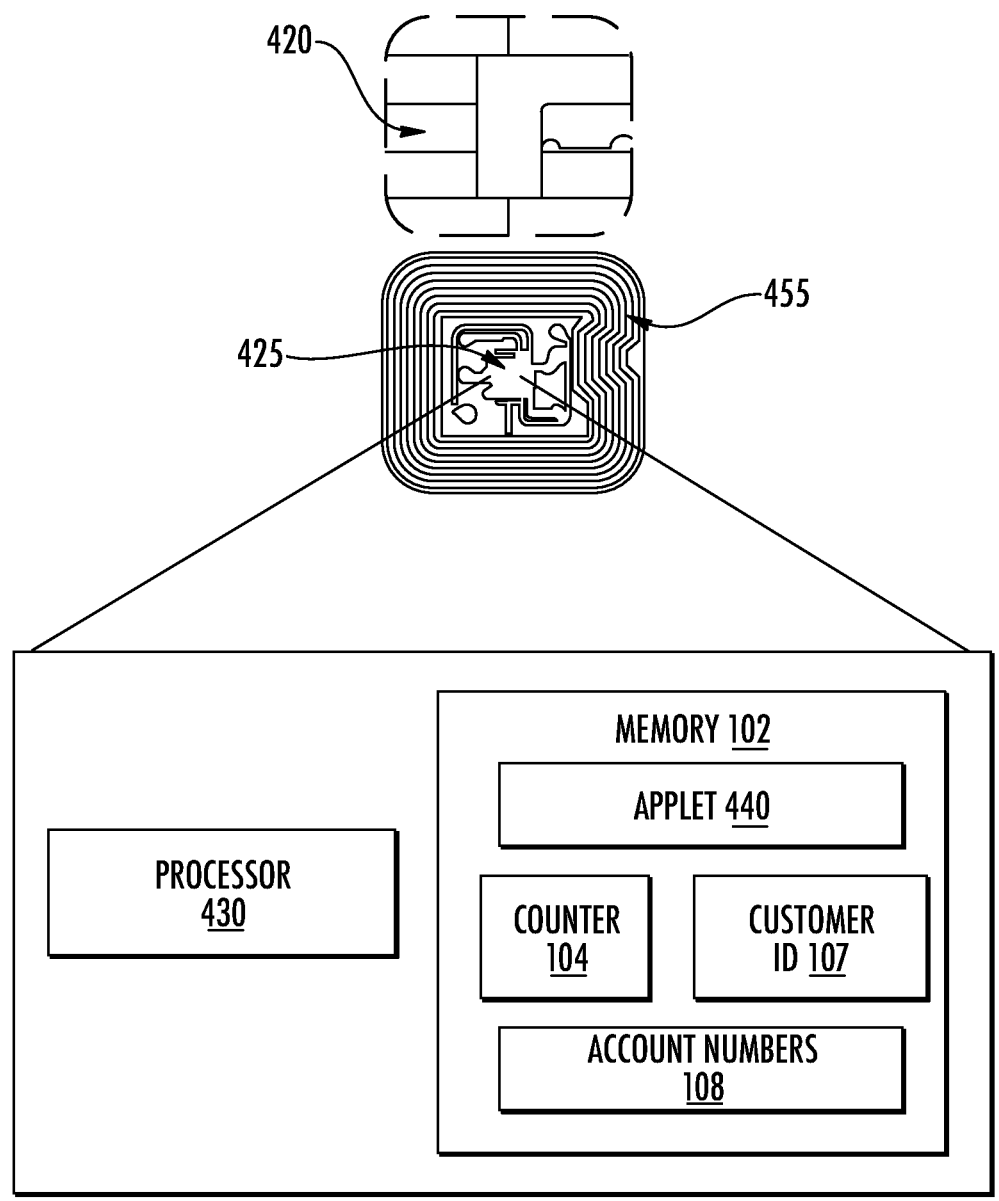

As illustrated in FIG. 4B, the contact pad 420 of the contactless card 401 may include processing circuitry 425 for storing and processing information, including a microprocessor 430 and the memory 102. It is understood that the processing circuitry 425 may contain additional components, including processors, memories, error and parity/CRC checkers, data encoders, anticollision algorithms, controllers, command decoders, security primitives and tamper-proofing hardware, as necessary to perform the functions described herein.

The memory 102 may be a read-only memory, write-once read-multiple memory or read/write memory, e.g., RAM, ROM, and EEPROM, and the contactless card 401 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory 102 is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more counters 104, a customer identifier 107, and virtual account numbers 108. The one or more applets 440 may include one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 401, and the identifier may distinguish the user of the contactless card from other contactless card users. In some examples, the customer identifier 107 may identify both a customer and an account assigned to that customer and may further identify the contactless card 401, which is associated with the customer's account. In some embodiments, the account numbers 108 may include thousands of one-time use virtual account numbers associated with the contactless card 401.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 402 elements located within the contact pad 420.

In some examples, the contactless card 401 may include one or more antennas (not shown). Generally, using the antennas, processing circuitry 425, and/or the memory 102, the contactless card 401 may provides a communications interface to communicate via NFC, Bluetooth, and/or Wi-Fi communications. In some embodiments, the antennas may be placed within the contactless card 401 and around the processing circuitry 425 of the contact pad 420. For example, the antennas may be integral with the processing circuitry 425 and the one or more antennas may be used with an external booster coil. As another example, antennas may be external to the contact pad 420 and the processing circuitry 425. As stated above, the antennas may communicate responses to the status messages to indicate whether the contactless card 401 is active. In the case no communication response is received from the antennas, authorization to access one or more digital services may be terminated.

As explained above, contactless cards 401 may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be configured to respond to one or more requests, such as near field data exchange requests, from a reader, such as a mobile NFC reader (e.g., of the client device 110), and produce an NDEF message that comprises a cryptographically secure OTP encoded as an NDEF text tag.

One example of an NDEF OTP is an NDEF short-record layout (SR=1). In such an example, one or more applets 440 may be configured to encode the OTP as an NDEF type 4 well known type text tag. In some examples, NDEF messages may include one or more records. The applets 440 may be configured to add one or more static tag records in addition to the OTP record.

In some examples, the one or more applets 440 may be configured to emulate an RFID tag. The RFID tag may include one or more polymorphic tags. In some examples, each time the tag is read, different cryptographic data is presented that may indicate the authenticity of the contactless card. Based on the one or more applications, an NFC read of the tag may be processed, the data may be transmitted to a server, such as the server 120 (FIG. 1), and the data may be validated at the server.

In some examples, the contactless card 401 and server 120 may include certain data such that the contactless card 401 may be properly identified. The contactless card 401 may include one or more unique identifiers, wherein each time a read operation takes place, the counter 104 may be configured to increment based upon recognition of the one or more unique identifiers. In some examples, each time data from the contactless card 401 is read (e.g., by a client device 110), the counter 104 is transmitted to the server for validation and determines whether the counter values 104 are equal (e.g., as part of the validation).

In some embodiments, during the creation process of the contactless card 401, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 401 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for the contactless card 401 may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5A:
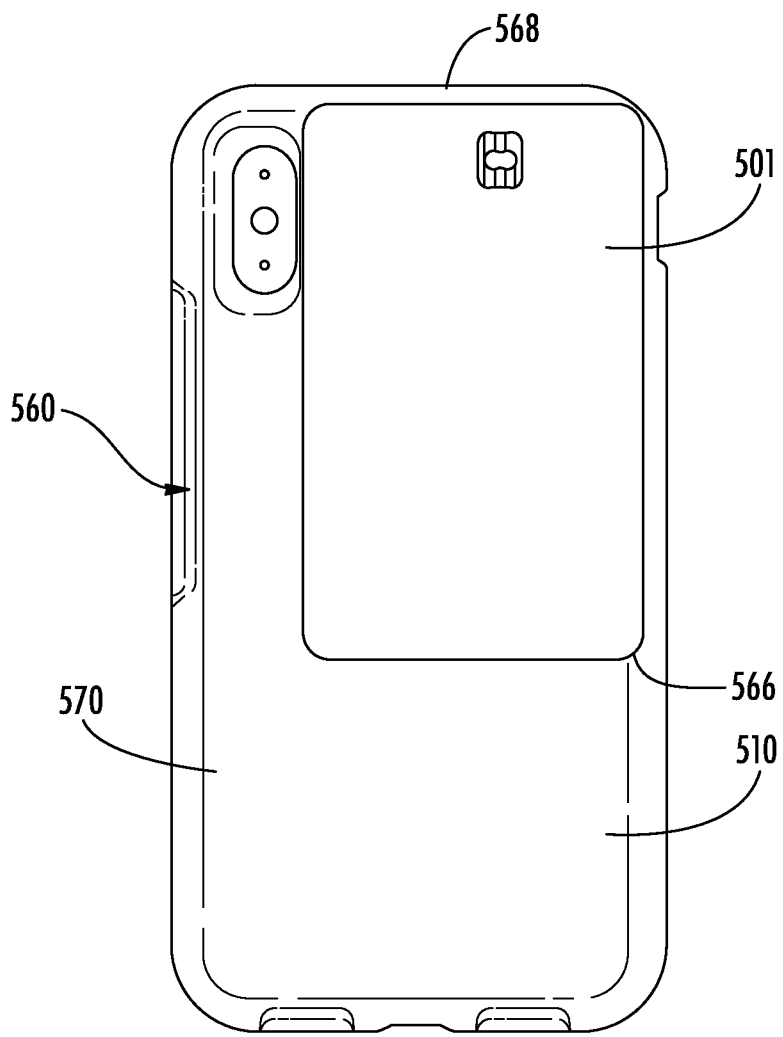
FIG. 5A illustrates a side view of an embodiment of a covering for a client device.
Figure 5B:
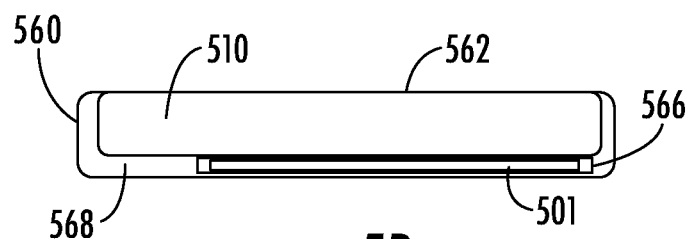
FIG. 5B illustrates an end view of an embodiment of the covering for the client device of FIG. 5A.

FIGS. 5A-5B illustrate a non-limiting embodiment of a covering 560 over the client device 510, such as a mobile device. The covering 560 may be a mobile device case that wraps around the client device 510. In some embodiments, the covering 560 may include an opening to permit user interaction with a screen 562 of the client device 510. As shown, the covering 560 may include a slot or receptacle 566 through an end wall 568 of the covering 560, wherein the receptacle 566 is operable to receive the contactless card 501 therein. Once retained within the receptacle 566, the contactless card 501 may be pre-positioned to enable communication with the card reader (not shown) of the client device 510. It will be appreciated that the covering 560, including the size and position of the receptacle 566, may be altered depending on one or more characteristics of the client device 501 and/or the contactless card 501. As further shown, the receptacle 566 and the contactless card 501 may be disposed along a back side 570 of the client device 510. In some embodiments, the covering 560 may be transparent or opaque. Embodiments herein are not limited in this context.

Figure 6:
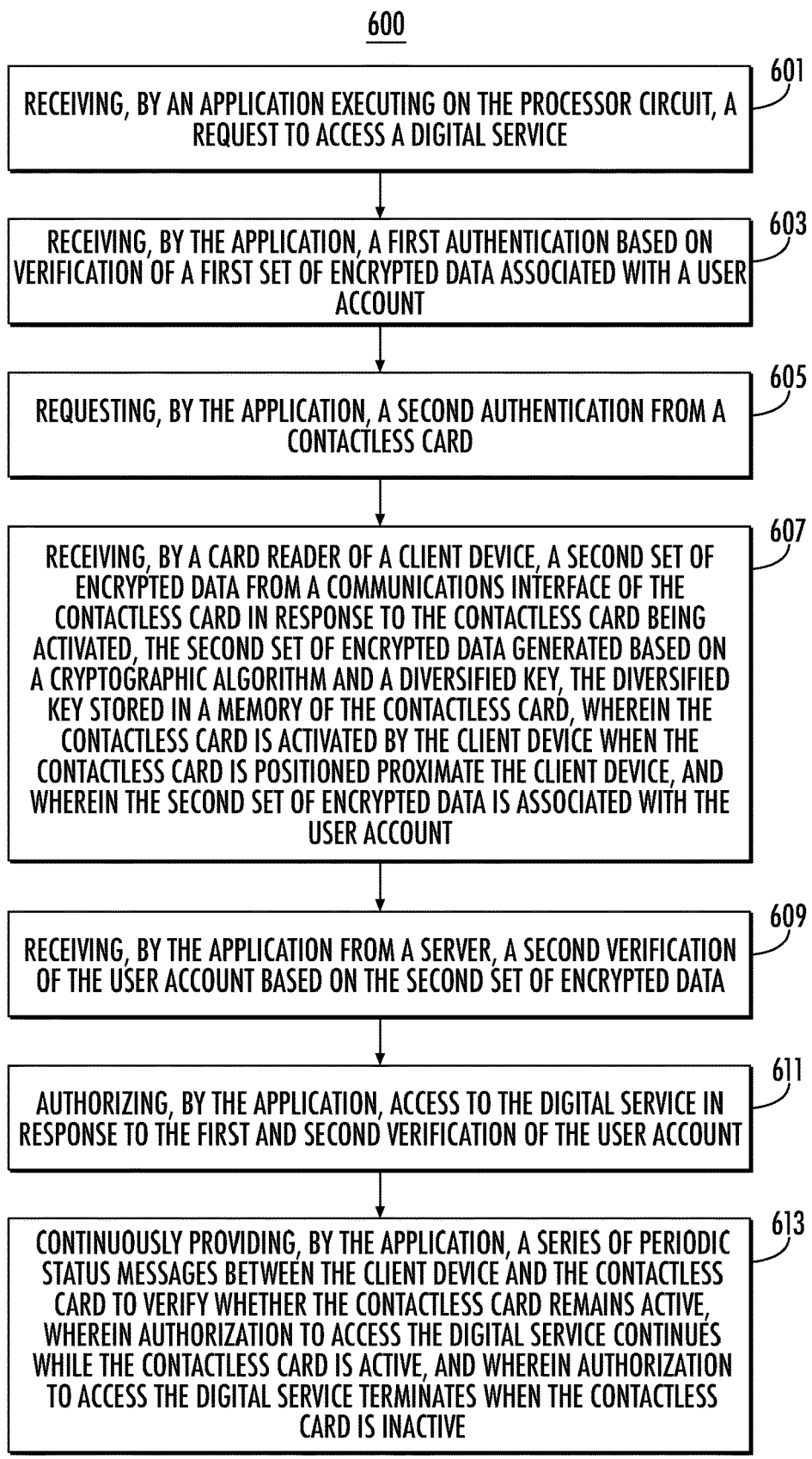
FIG. 6 illustrates an embodiment of a logic flow for providing continuous authentication to a digital service.

FIG. 6 illustrates an embodiment of a logic flow 600 for providing continuous authentication to a digital service. At block 601, the logic flow 600 may include receiving, by an application executing on the processor circuit, a request to access a digital service. In some embodiments, the digital service may include one or more services including, but not limited to, a client device application (e.g., banking, social media, music streaming, gaming, etc.), a website, or a messaging service (e.g., e-mail, text, etc.). At block 603, the logic flow 600 may include receiving, by the application, a first authentication based on verification of a first set of encrypted data associated with a user account. In some embodiments, the first set of encrypted data is generated based on log-in credentials supplied by the user to the digital service. At block 605, the logic flow 600 may include requesting, by the application, a second authentication from a contactless card.

At block 607, the logic flow 600 may include receiving, by a card reader of a client device, a second set of encrypted data from a communications interface of the contactless card in response to the contactless card being activated, the second set of encrypted data generated based on a cryptographic algorithm and a diversified key, the diversified key stored in a memory of the contactless card, wherein the contactless card is activated by the client device when the contactless card is positioned proximate the client device, and wherein the second set of encrypted data is associated with the user account.

At block 609, the logic flow 600 may include receiving, by the application from a server, a second verification of the user account based on the second set of encrypted data. At block 611, the logic flow may include authorizing, by the application, access to the digital service in response to the first and second verification of the user account. At block 613, the logic flow may include continuously providing, by the application, a series of periodic status messages between the client device and the contactless card to verify whether the contactless card remains active, wherein authorization to access the digital service continues while the contactless card is active, and wherein authorization to access the digital service terminates when the contactless card is inactive.

In some examples, the contactless cards described herein may be placed atop a device, such as one or more computer kiosks or terminals, to verify identity so as to receive a transactional item responsive to a purchase, such as a coffee. By using the contactless cards, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless cards and the device, which may configured to process one or more tap gestures. As explained above, the one or more applications may be configured to validate identity of the user. In some examples, data for example, bonus points, loyalty points, reward points, healthcare information, etc., may be written back to the contactless card.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a client device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card contactless cards can selectively communicate information depending upon the recipient device. Once brought into proximity, the contactless cards can recognize the device to which the contactless card is directed, and based on this recognition, the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to various scenarios, including card activation, balance transfers, account access attempts, commercial transactions, and step-up fraud reduction.

As another example, continuous authentication can be directed to a POS device, including without limitation a kiosk, a checkout register, a payment station, or other terminal. The contactless cards can recognize the POS device and transmit only the information necessary for the action or transaction. For example, upon recognition of a POS device used to complete a commercial transaction, the contactless cards can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless cards may be placed against or near a client device without having to open an application, to indicate a desire or intent to utilize one or more of reward points, loyalty points, coupons, offers, or the like to cover one or more purchases. Thus, an intention behind the purchase is provided.

Figure 7:
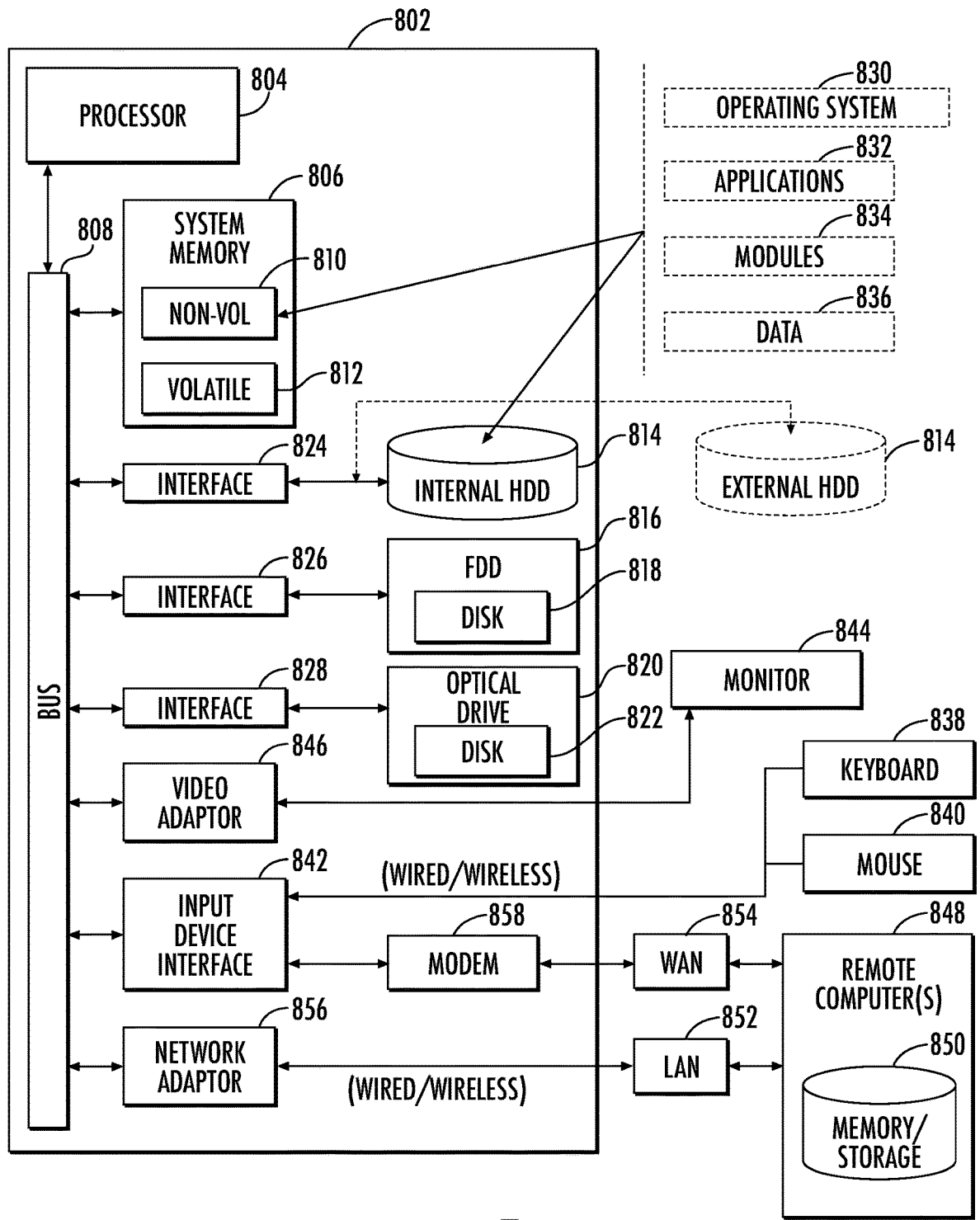
FIG. 7 illustrates an embodiment of a computing architecture.

FIG. 7 illustrates an embodiment of an exemplary computing architecture 800 comprising a computing system 802 that may be suitable for implementing various embodiments as previously described. In various embodiments, the computing architecture 800 may include or be implemented as part of an electronic device. In some embodiments, the computing architecture 800 may be representative, for example, of a system 100 (FIG. 1) that implements one or more components of the system. In some embodiments, computing system 802 may be representative, for example, of the client devices 110 and server 120 of the system 100. Embodiments herein are not limited in this context. More generally, the computing architecture 800 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 7, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the operating system 112, account application 113, digital service 114, other applications 115, clipboard 116, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium having computer-readable program code stored thereon, the computer-readable program code including instructions which when executed by a processor circuit of a client device cause the processor circuit to perform operations comprising:

receiving, by an application executing on the processor circuit, a request to access a digital service;

performing, by the application, a first authentication by verifying that a first set of encrypted data is associated with a user account;

requesting, by the application based on the first authentication, a second authentication from a contactless card, wherein the contactless card is activated by a magnetic field of the client device;

receiving, by a card reader of the client device, a second set of encrypted data from the contactless card in response to the contactless card being activated, wherein the second set of encrypted data is based on a cryptographic algorithm and a diversified key stored in a memory of the contactless card, the diversified key based on a master key and a counter value of the contactless card, wherein the second set of encrypted data is associated with the user account and is received from the contactless card in a near-field communication (NFC) data exchange format (NDEF) message in response to the contactless card coming into a communication range of the client device;

performing, by the application, the second authentication based on the second set of encrypted data;

authorizing, by the application, access to the digital service in response to the first authentication and the second authentication;

transmitting, by the application at each of a plurality of time intervals, a respective status message of a plurality of status messages to the contactless card by energizing an NFC interface and an antenna to verify that the contactless card is active;

receiving, by the application, a first response of a plurality of responses in response a first status message of the plurality of status messages, wherein each of the plurality of responses are received in one or more NDEF messages communicated by the contactless card;

providing, by the application based on the first response, access to the digital service, without requiring re-authentication;

determining, by the application, that a response to a second status message of the plurality of status messages is not received from the contactless card; and terminating, by the application, access to the digital service based on the determination that the response to the second status message is not received from the contactless card.

2. The non-transitory computer-readable storage medium of claim 1, further comprising computer-readable program code including instructions which when executed by the processor circuit cause the processor circuit to perform operations further comprising:

determining, by the application, that a signal strength of the contactless card is below a threshold value, wherein the application determines that the second status message is not received based on the determination that the signal strength of the contactless card is below the threshold value.

3. The non-transitory computer-readable storage medium of claim 2, further comprising computer-readable program code including instructions which when executed by the processor circuit cause the processor circuit to perform operations further comprising displaying, via a graphical user interface of the client device, the signal strength of the contactless card.

4. The non-transitory computer-readable storage medium of claim 1, further comprising computer-readable program code including instructions which when executed by the processor circuit cause the processor circuit to perform operations comprising providing the second authentication to a second client device to enable access to a digital service operating on the second client device.

5. The non-transitory computer-readable storage medium of claim 1, further comprising computer-readable program code including instructions which when executed by the processor circuit cause the processor circuit to perform operations comprising:

sending, by the application, the second set of encrypted data to a server; and receiving, by the application from the server, the second authentication based on the second set of encrypted data, wherein the counter value of the contactless card is synchronized with a counter value maintained the server.

6. The non-transitory computer-readable storage medium of claim 1, wherein processing circuitry of the communications interface of the contactless card supports at least one of near field communication (NFC), Bluetooth, and Wi-Fi, and wherein the second set of encrypted data includes at least one of: an encrypted expiration date, an encrypted billing address, and an encrypted card verification value (CVV) associated with the user account.

7. A system, comprising:

a client device operable with a contactless card, the client device including a processor circuit; and a memory storing instructions which when executed by the processor circuit, cause the processor circuit to perform operations comprising:

receiving, by an application executing on the processor circuit, a request to access a digital service;

performing, by the application, a first authentication by verifying that a first set of encrypted data is associated with a user account;

requesting, by the application based on the first authentication, a second authentication from the contactless card, wherein the contactless card is activated by a magnetic field of the client device;

receiving, by a card reader of the client device, a second set of encrypted data from the contactless card in response to the contactless card being activated, wherein the second set of encrypted data is based on a cryptographic algorithm and a diversified key stored in a memory of the contactless card, the diversified key based on a master key and a counter value of the contactless card, wherein the second set of encrypted data is associated with the user account and is received from the contactless card in a near-field communication (NFC) data exchange format (NDEF) message in response to the contactless card coming into a communication range of the client device;

performing, by the application, the second authentication based on the second set of encrypted data;

authorizing, by the application, access to the digital service in response to the first authentication and the second authentication;

transmitting, by the application at each of a plurality of time intervals, a respective status message of a plurality of status messages to the contactless card by energizing an NFC interface and an antenna to verify that the contactless card is active;

receiving, by the application, a first response of a plurality of responses in response a first status message of the plurality of status messages, wherein each of the plurality of responses are received in one or more NDEF messages communicated by the contactless card;

providing, by the application based on the first response, access to the digital service, without requiring re-authentication;

determining, by the application, that a response to a second status message of the plurality of status messages is not received from the contactless card; and terminating, by the application, access to the digital service based on the determination that the response to the second status message is not received from the contactless card.

8. The system of claim 7, the memory storing instructions which when executed by the processor circuit, cause the processor circuit to perform operations further comprising:

determining, by the application, that a signal strength of the contactless card is below a predetermined threshold value or that the client device entered a sleep mode, wherein the application determines that the second status message is not received based on the determination that the signal strength of the contactless card is below the threshold value or that the client device has entered the sleep mode.

9. The system of claim 8, the memory storing instructions which when executed by the processor circuit, cause the processor circuit to perform operations further comprising displaying the signal strength of the contactless card via a graphical user interface of the client device.

10. The system of claim 7, further comprising a second client device, wherein the memory stores instructions which when executed by the processor circuit, cause the processor circuit to perform operations further comprising providing the second authentication to a second client device to enable access to a digital service operating on the second client device.

11. The system of claim 10, wherein the client device is a mobile device, and wherein the second client device is a personal computer.

12. The system of claim 11, the memory storing instructions which when executed by the processor circuit, cause the processor circuit to perform operations further comprising:

sending, by the application the second set of encrypted data to a server; and receiving, by the application from the server, the second authentication based on the second set of encrypted data, wherein the counter value of the contactless card is synchronized with a counter value maintained the server.

13. The system of claim 7, further comprising a physical covering over the client device, the physical covering including a slot through an end wall of the physical covering, the slot defining a set of walls operable to house the contactless card, wherein the slot is disposed along a backside of the client device.

14. A method, comprising:

receiving, by an application executing on a processor circuit of a client device, a request to access a digital service;

performing, by the application, a first authentication by verifying that a first set of encrypted data is associated with a user account;

requesting, by the application based on the first authentication, a second authentication from a contactless card, wherein the contactless card is activated by a magnetic field of the client device;

generating, by the contactless card in response to the contactless card being activated, a second set of encrypted data based on a cryptographic algorithm and a diversified key, wherein the diversified key is generated by the contactless card based on a master key and a counter value of the contactless card;

receiving, by a card reader of the client device and from the contactless card, the second set of encrypted data, wherein the second set of encrypted data is associated with the user account and is received from the contactless card in a near-field communication (NFC) data exchange format (NDEF) message in response to the contactless card coming into a communication range of the client device;

performing, by the application, the second authentication based on the second set of encrypted data;

authorizing, by the application, access to the digital service in response to the first authentication and the second authentication;

transmitting, by the application at each of a plurality of time intervals, a respective status message of a plurality of status messages to the contactless card by energizing an NFC interface and an antenna to verify that the contactless card is active;

receiving, by the application, a first response of a plurality of responses in response a first status message of the plurality of status messages, wherein each of the plurality of responses are received in one or more NDEF messages communicated by the contactless card;

providing, by the application based on the first response, access to the digital service, without requiring re-authentication;

determining, by the application, that a response to a second status message of the plurality of status messages is not received from the contactless card; and terminating, by the application, access to the digital service based on the determination that the response to the second status message is not received from the contactless card.

15. The method of claim 14, further comprising:

determining, by the application, that a signal strength of the contactless card is below a threshold value, wherein the application determines that the second status message is not received based on the determination that the signal strength of the contactless card is below the threshold value.

16. The method of claim 15, further comprising displaying the signal strength of the contactless card via a graphical user interface of the client device.

17. The method of claim 14, further comprising:

sending, by the application, the second set of encrypted data to a server; and receiving, by the application from the server, the second authentication based on the second set of encrypted data wherein the counter value of the contactless card is synchronized with a counter value maintained the server.

18. The method of claim 14, further comprising receiving the contactless card within a slot through an end wall of a physical covering, the slot defining a set of walls operable to house the contactless card, and the slot disposed along a backside of the client device when the client device is coupled with the physical covering.

19. The method of claim 14, further comprising, based on the termination of the access to the digital service:

receiving, by the application, a third authentication based on verification of a third set of encrypted data associated with the user account;

receiving, by the application via the card reader, a fourth set of encrypted data from the contactless card;

performing, by the application, a fourth authentication based on the second set of encrypted data; and authorizing, by the application, access to the digital service in response to the third authentication and the fourth authentication.

20. The method of claim 19, further comprising:

transmitting, by the application at each of an additional plurality of time periods, a respective additional status message of a plurality of additional status messages to the contactless card to verify that the contactless card is active;

receiving, by the application, a first additional response of a plurality of additional responses from the contactless card in response to a first additional status message of the plurality of additional status messages;

providing, by the application based on the first additional response, access to the digital service without requiring re-authentication;

determining, by the application, that an additional response to a second additional status message of the plurality of additional status messages is not received from the contactless card; and terminating, by the application, access to the digital service based on the determination that the response to the second additional status message is not received from the contactless card.

* * * * *